June 9, 1964   A. J. JACOBSEN ETAL   3,136,195
UNDERLYING MEANS FOR PUNCHING A CLUTCH PLATE
Filed Sept. 8, 1960   2 Sheets-Sheet 1
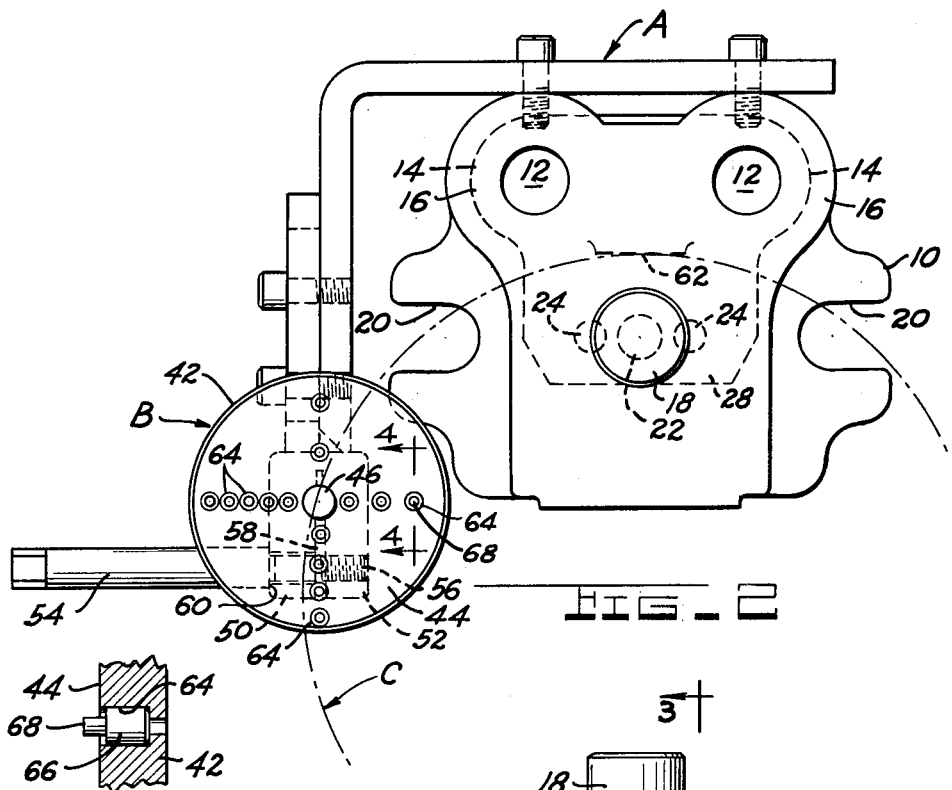
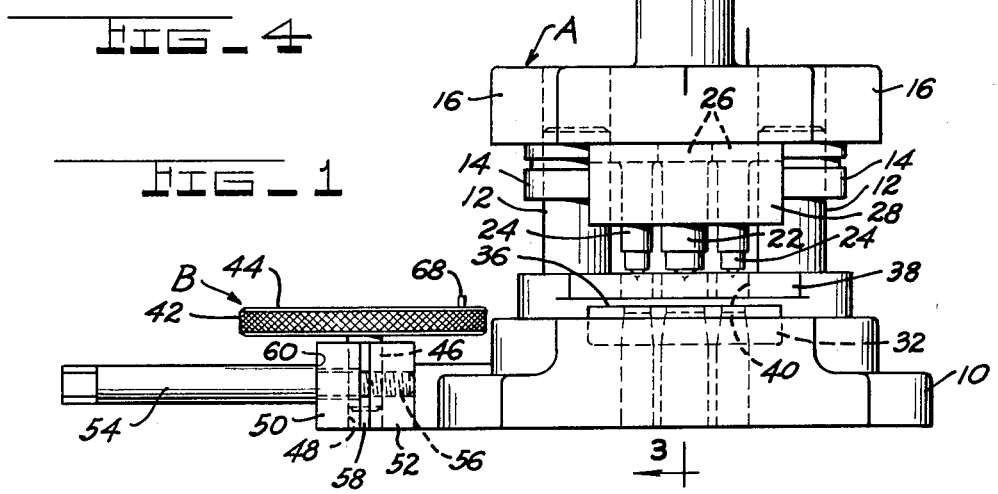
INVENTORS.
ALBERT J. JACOBSEN.
EMIL F. ZLOTNICK.
BY
William P. Hickey
ATTORNEY.

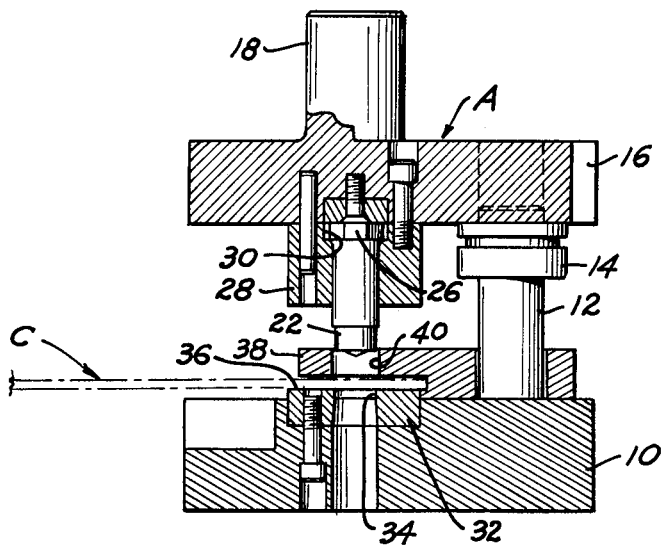
FIG_3

United States Patent Office 3,136,195
Patented June 9, 1964

3,136,195
UNDERLYING MEANS FOR PUNCHING
A CLUTCH PLATE
Albert J. Jacobsen and Emil F. Zlotnick, Green Island, Troy, N.Y., assignors to The Bendix Corporation, Green Island, N.Y., a corporation of Delaware
Filed Sept. 8, 1960, Ser. No. 54,677
2 Claims. (Cl. 83—467)

The present invention relates to a device for performing a plurality of machining operations accurately with respect to spaced openings in plates and the like; and more particularly to a set of dies having an indexing device thereon for accurately positioning new openings in used clutch plates.

The principal object of the present invention is the provision of a simple and inexpensive device for accurately positioning new openings in used clutch plates and the like so that inorganic friction segments can be installed in place of the previous organic lining on these plates.

Further objects and advantages of the invention will become apparent to those skilled in the art to which the invention relates from the following description of the preferred embodiment described with reference to the accompanying drawings forming a part of this specification, and in which:

FIGURE 1 is a front elevational view of a set of dies incorporating principles of the present invention;

FIGURE 2 is a plan view of the device shown in FIGURE 1;

FIGURE 3 is a vertical cross sectional view taken approximately on the line 3—3 of FIGURE 1; and FIGURE 4 is a fragmentary cross sectional view taken on the line 4—4 of FIGURE 2.

The usual clutch plate of an automotive vehicle is a generally disc-shaped object having a plurality of organic lining segments spaced uniformly on its opposite faces adjacent its outer periphery. These organic segments are attached to the clutch plate structure by means of rivets which are arranged in a pattern which is identical for each of the organic segments. These organic segments are in turn evenly spaced around the opposite faces of the clutch plate structure so that the lined clutch plate will be statically and dynamically balanced. In general, inorganic linings are more rugged and serviceable than organic linings and from time to time it is desired to replace the organic linings of clutch plates with the inorganic type. The inorganic type in general require a different riveting hole pattern than do the organic linings and so as previously indicated it is an object of the present invention to provide simple and inexpensive means for forming new rivet hole patterns symmetrically about these clutch plates which have previously had an organic lining thereon.

The device shown in the drawing for repunching used clutch plates with the hole pattern required by the inorganic lining friction segments generally comprises a die set A having an indexing device B fixed thereto for accurately positioining the clutch plates relative to the working portions of the die. The die set A in turn generally comprises a base or bed 10 having a pair of vertical posts 12 thereon which are received in suitable sliding guide bearings 14 that are pressed in or otherwise secured to the movable head 16. The movable head 16 has a vertically extending boss 18 thereon for securing in the movable head of a conventional punch press, not shown; and the base structure 10 has suitable bolt slots 20 in its opposite sides for securing the base of the die 10 to the bed of the punch press, not shown. Reciprocatory movement of the head of the press towards its base therefore causes the movable head 16 of the die set A to slide up and down on the vertical posts 12 in a positive and accurate manner. The particular inorganic linings segments with which we are concerned uses an attachment hole pattern which consists of a large diameter rivet hole, and a pair of smaller diameter openings individual ones of which are positioned on opposite sides of the large rivet hole. This hole pattern is formed by means of three punches, a central large diameter punch 22 and a pair of smaller punches 24 on opposite sides of the punch 22. Each of the punches 22 and 24 have a headed portion 26 thereon by means of which the punches are fastened to the movable head 16 of the die set A. The punches 22 and 24 project through suitable openings in a punch holder 28, with the headed portions 26 of each punch being received in a suitable slot in the top surface of the punch holder 28. Each of the headed portions 26 have flat sides thereon which engage the side surfaces of the slot 30 and so prevent rotation of the punches. Punch holder 28 in turn is suitably dowelled and bolted to the movable head 16 of the die set so as to move up and down with the head 16.

The base 10 of the die set A is provided with an anvil 32 having a hole pattern therein the indiivdual holes of which receive the bottom end of individual ones of said punches 22 and 24. The clutch plate which is to be punched for the inorganic lining segments is laid upon the upper surface of the anvil 32 and the press operated to bring the punches 22 and 24 down onto the plate to force or shear circular slugs of metal down into the die holes 34 in the anvil 32. The bottom end of the die holes 34 are enlarged to permit the stamped slugs to fall freely out through aligned openings in the base 10 of the die set; and a suitable stripper plate 38 is provided in the region above the work supporting surface 36 to hold the clutch plate down during the return or upward stroke of the die head 16 and thereby pull the punches 22 and 24 out of the new formed openings formed in the clutch plate. Each of the punches 22 and 24 are suitably stepped so that their small diameter end portion which does the punching in the clutch plate does not engage the sidewalls of the openings in the stripper plate 38. The large diameter portion of the punches 22 and 24 however are so sized as to be guided in the holes 40 and thereby aid the guide bearings 14 in guiding the punches with respect to the die holes 34 of the anvil 36.

In order that the clutch plates generally indicated at C can be quickly indexed so as to symmetrically locate the holes that are to be punched therein, an indexing device B is provided which comprises a circular plate 42 having a top surface 44 that is positioned generally at or below the work supporting surface 36 of the anvil 32. The circular plate 42 is rotatably mounted on an axis parallel to the axis of the punches 22 and 24 by means of a downwardly projecting shaft 46 which is received in a vertical opening 48 of a clamping structure 50. The clamping structure 50 generally comprises a block 52 one side of which is slotted through the opening 48 so that the opposite sides of the block 52 can be drawn together against the shaft 46 of the circular plate 42. The opposite sides of the block 52 are suitably drawn together and clamped by means of a pin 54 having a threaded end portion 56 that is threadedly received in one end of the portion of the block of the slot 58, and a shoulder 60 which abuts the outer face of the portion of the block 52 on the opposite side of the slot 58.

The indexing device B is positioned to one side of the die set A in such a manner that a clutch plate C when placed upon the anvil 32 with its outer edges in engagement with the stopping surface 62 of the stripper plate will overlie at least a portion of the circular plate 42. The circular plate 42 is provided with a plurality of counterbored openings 64 in its top surface. The counterbored openings 64 are arranged to be spaced at varying distances from the axis of the shaft 46 as is conveniently done by the four rows of openings shown in the drawing; so that upon rotation of the circular plate 42, at least one of the counterbored openings 64 can be brought into alignment with one of the holes in one of the existing organic rivet hole patterns. After one of the holes 64 is aligned with one of the holes of the existing organic rivet hole patterns, a pin 66 is placed in the aligned opening 64 in such manner that its small diameter portion 68 projects out of the top surface 44 into the aligned opening of the clutch plate. The circular plate 42 is clamped against rotation by tightening of the pin 54 to clamp the block 52 about the shaft 46. Pressure can then be applied to the clutch plate causing it to pivot about the pin 66 into firm abutment with the stopping surface 62, so that it will remain fixed during the punching operation. The punch press is then operated to punch one new set of three openings; and thereafter the clutch plate is swung out of the die and the hole of another existing set of organic rivet openings corresponding with the particular hole opening which had previously received the pin 68 is swung into position over the pin 66. The plate is again brought into position against the stopping surface 62 and the punch press operated so that another set of three new openings are formed in the same manner and relative position as the first set of three openings were formed relative to their organic rivet openings. The clutch plate is similarly moved until the new sets of inorganic rivet openings are positioned in the same symmetrical arrangement that the old organic rivet patterns was arranged.

It will be apparent to those skilled in the art that the objects heretofore enumerated as well as others have been achieved; and that there has been provided a new and inexpensive device for accurately forming new hole patterns in symmetrical arrangements in old plates having different hole patterns that are symmetrically arranged around its face.

While the objects heretofore enumerated as well as others have been accomplished, we do not wish to be limited to the particular construction shown and described; and it is our intention to cover hereby all novel adaptations, modifications and arrangements thereof which come within the practice of those skilled in the art to which the invention relates.

We claim:
1. In an indexing device for a tool for performing work on work plates having a plurality of spaced openings: a bed having a generally flat surface for supporting material to be worked upon, a rotatable plate, one surface of which lies generally in the plane of said bed, said plate being rotatable about an axis generally perpendicular to said work supporting surface and having a plurality of holes therein which are generally parallel to said axis and which are spaced radially from said axis at various distances, means for clamping said plate against rotation, abutment means positioned to one side of said bed spaced from said rotatable plate, and a movable pin having a slidable fit in individual ones of said plurality of holes in said rotatable plate and adapted to be received in said openings of said work plates.

2. A jig and the like for forming holes in work plates having a plurality of spaced openings comprising: an anvil having a work supporting surface with a die opening therein, a die head having a punch adapted to be moved into said die opening, means for guiding said punch into said die opening, a rotatable plate one surface of which lies generally in the plane of said work supporting surface of said anvil, said plate being rotatable about an axis generally perpendicular to said work supporting surface and having a plurality of holes therein which are parallel to said axis and which are spaced at various distances from said axis, means for clamping said plate against rotation, abutment means positioned to one side of said anvil spaced from said rotatable plate, and a movable pin having a slidable fit in individual ones of said plurality of holes in said rotatable plate and adapted to be received in said openings of said work plates.

References Cited in the file of this patent
UNITED STATES PATENTS

| | | |
|---|---|---|
| 191,311 | Choate | May 29, 1877 |
| 246,350 | Stover | Aug. 30, 1881 |
| 680,599 | Jones | Aug. 13, 1901 |
| 1,161,038 | Eaton | Nov. 23, 1915 |
| 1,382,674 | Rich | June 28, 1921 |
| 1,511,236 | Rosenberg | Oct. 14, 1924 |
| 1,763,869 | Spiers | June 17, 1930 |
| 2,017,247 | Hodge | Oct. 15, 1935 |
| 2,433,533 | Shera | Dec. 30, 1947 |
| 2,768,686 | Feiertag | Oct. 30, 1956 |
| 2,781,096 | Garity | Feb. 12, 1957 |
| 3,027,632 | Baynes | Apr. 3, 1962 |
| 3,045,518 | Kjelgaard | July 24, 1962 |

FOREIGN PATENTS

| | | |
|---|---|---|
| 134,373 | Great Britain | Nov. 6, 1919 |